US012647796B2

(12) United States Patent
Pathania et al.

(10) Patent No.: US 12,647,796 B2
(45) Date of Patent: Jun. 2, 2026

(54) RADIO ACCESS NETWORK SLICING

(71) Applicant: Boost SubscriberCo L.L.C., Englewood, CO (US)

(72) Inventors: Amit Pathania, Great Falls, VA (US); Dhaval Mehta, Aldie, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 426 days.

(21) Appl. No.: 18/189,342

(22) Filed: Mar. 24, 2023

(65) Prior Publication Data

US 2024/0323698 A1 Sep. 26, 2024

(51) Int. Cl.
| | |
|---|---|
| *H04W 16/10* | (2009.01) |
| *H04L 41/16* | (2022.01) |
| *H04W 24/02* | (2009.01) |

(52) U.S. Cl.
CPC ............. *H04W 16/10* (2013.01); *H04L 41/16* (2013.01); *H04W 24/02* (2013.01)

(58) Field of Classification Search
CPC ...................................................... H04L 41/16
See application file for complete search history.

(56) References Cited

U.S. PATENT DOCUMENTS

| | | | |
|---|---|---|---|
| 10,536,946 B2 | 1/2020 | Zhu et al. | |
| 10,992,396 B1 * | 4/2021 | Nahata ................ | H04L 41/0896 |
| 11,882,006 B1 | 1/2024 | Nesteroff et al. | |
| 2017/0164349 A1 | 6/2017 | Zhu et al. | |

| | | | |
|---|---|---|---|
| 2020/0053834 A1 * | 2/2020 | Dahan ................... | H04W 88/18 |
| 2020/0244546 A1 | 7/2020 | Tidemann et al. | |
| 2020/0296569 A1 | 9/2020 | Kumar et al. | |
| 2021/0036920 A1 | 2/2021 | Erman et al. | |
| 2021/0368514 A1 * | 11/2021 | Xing ................... | H04L 41/0896 |
| 2022/0345995 A1 | 10/2022 | Gupta et al. | |
| 2023/0180115 A1 * | 6/2023 | Gomes Da Silva .. | H04W 48/18 370/328 |
| 2023/0199552 A1 | 6/2023 | Bahl et al. | |
| 2023/0275814 A1 | 8/2023 | Gupta et al. | |
| 2024/0187933 A1 | 6/2024 | Bhaskaran et al. | |

(Continued)

FOREIGN PATENT DOCUMENTS

| | | | | |
|---|---|---|---|---|
| EP | 3748908 A1 * | 12/2020 | ......... | H04L 41/0893 |

OTHER PUBLICATIONS

Amit Pathania et al., "Radio Access Network Slicing," U.S. Appl. No. 18/189,339, filed Mar. 24, 2023. (32 Pages).

(Continued)

*Primary Examiner* — Jamaal Henson
(74) *Attorney, Agent, or Firm* — Kipman T. Werking; Frontier IP Law PLLC

(57) ABSTRACT

A disclosed method may include (i) providing, to an end-user of a radio access network, a graphical user interface that enables the end-user to configure at least one of a plurality of control knobs for configuring a slice of the radio access network, (ii) receiving, after the providing the graphical user interface, user input from the end-user through the graphical user interface indicating how the end-user would adjust the at least one of the control knobs for configuring the slice of the radio access network, and (iii) configuring the slice of the radio access network according to the user input from the end-user through the graphical user interface. Related systems and computer-readable mediums are further disclosed.

18 Claims, 8 Drawing Sheets

(56)     References Cited

U.S. PATENT DOCUMENTS

2025/0071658 A1     2/2025   Kinoshita
2025/0097732 A1*    3/2025   Hegde ................... H04W 24/02

OTHER PUBLICATIONS

"Dials vs. Sliders: When and how to use?", UX User Experience, https://ux.stackexchange.com/questions/101764/dials-vs-sliders-when-and-how-to-use. 2017.

* cited by examiner

100

200
202
FREQUENCY KNOBS
204
RESOURCE KNOBS
206
PERFORMANCE KNOBS
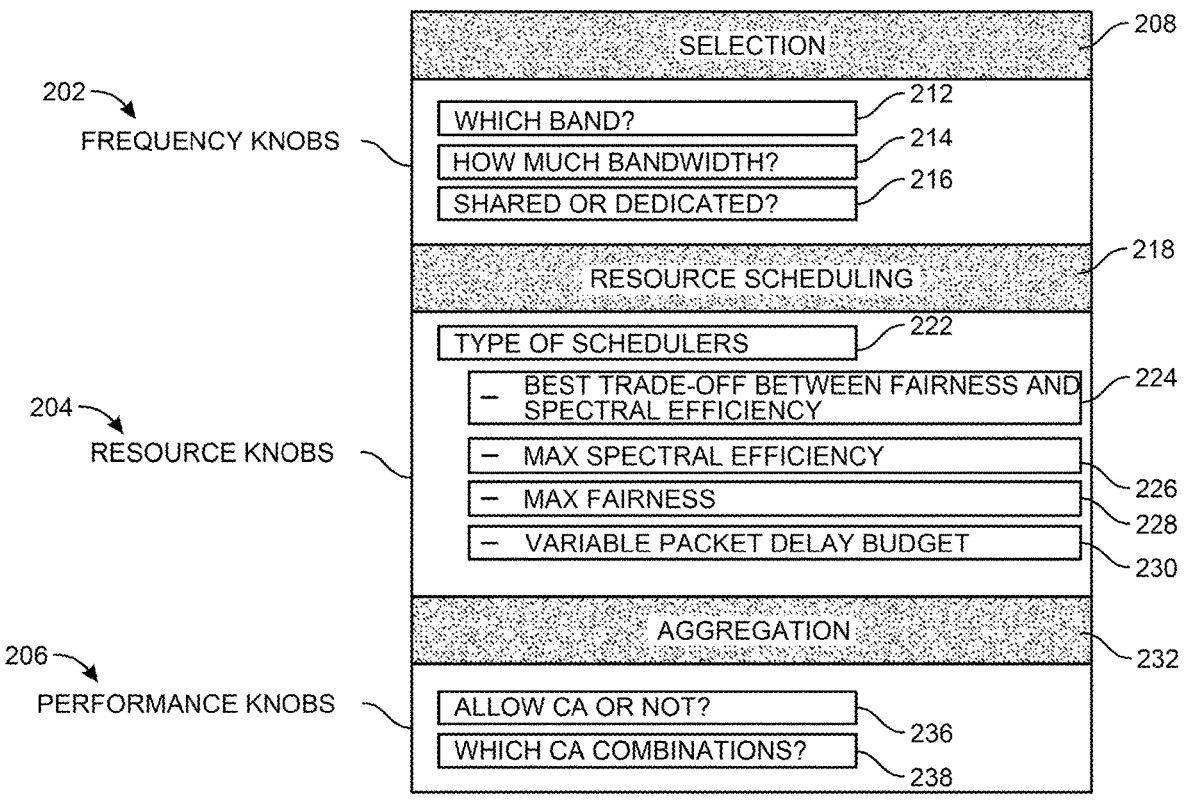
*FIG. 2*

300
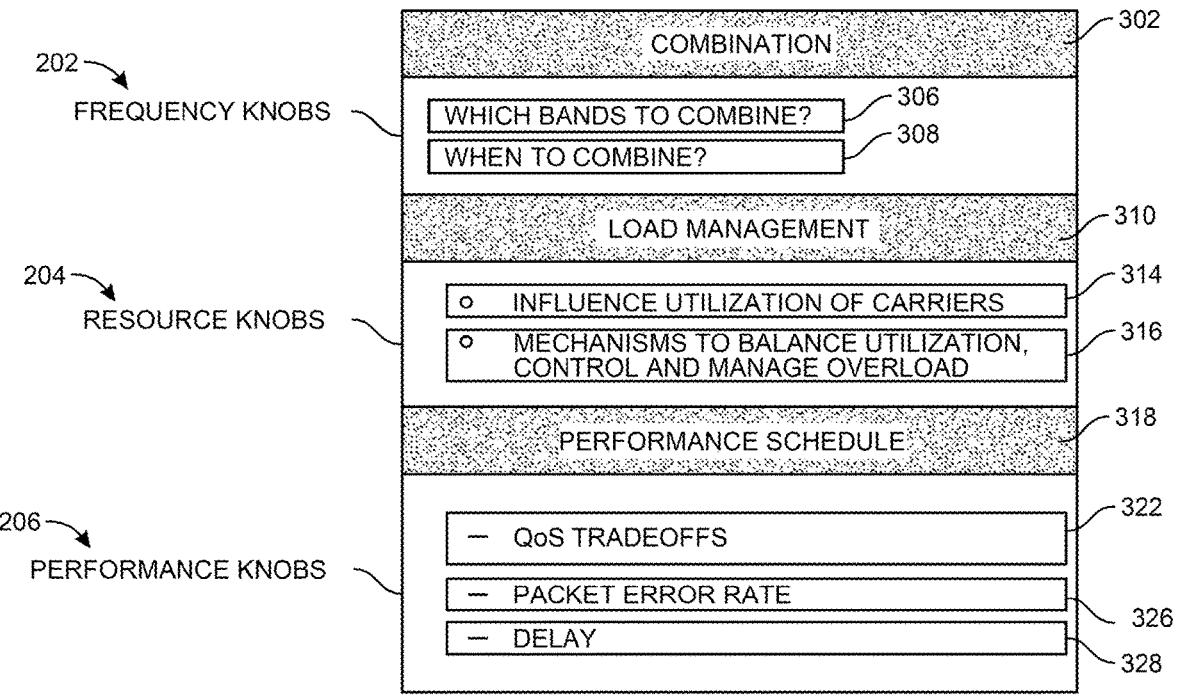
202 — FREQUENCY KNOBS
204 — RESOURCE KNOBS
206 — PERFORMANCE KNOBS
COMBINATION — 302
WHICH BANDS TO COMBINE? — 306
WHEN TO COMBINE? — 308
LOAD MANAGEMENT — 310
○ INFLUENCE UTILIZATION OF CARRIERS — 314
○ MECHANISMS TO BALANCE UTILIZATION, CONTROL AND MANAGE OVERLOAD — 316
PERFORMANCE SCHEDULE — 318
— QoS TRADEOFFS — 322
— PACKET ERROR RATE — 326
— DELAY — 328
*FIG. 3*

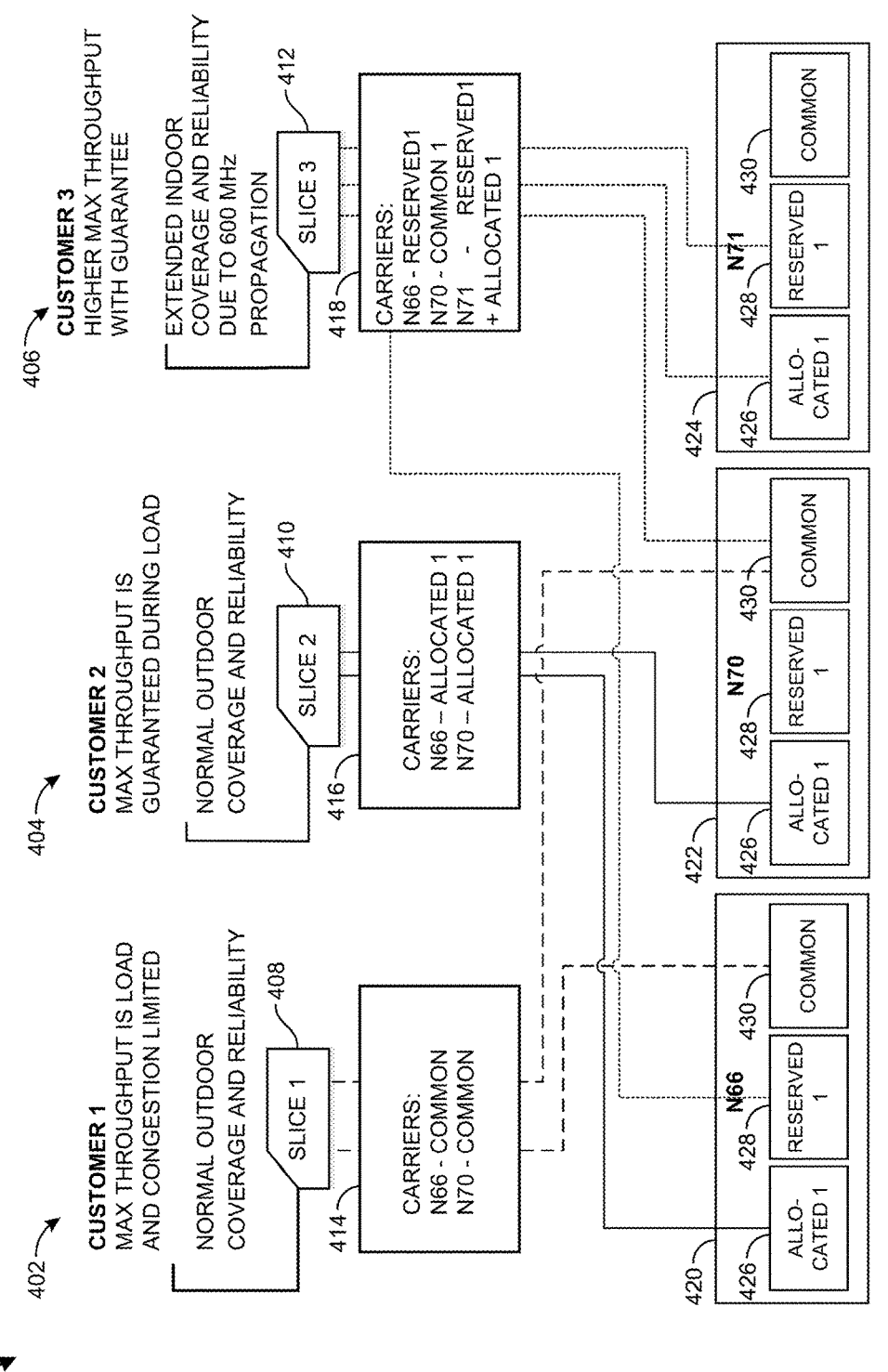

EXAMPLE OF HOW RAN SLICING CAN PROVIDE AN SLA GUARANTEE VIA SPECTRUM CONTROL

CUSTOMER 1
MAX THROUGHPUT IS LOAD AND CONGESTION LIMITED

NORMAL OUTDOOR COVERAGE AND RELIABILITY

CUSTOMER 2
MAX THROUGHPUT IS GUARANTEED DURING LOAD

NORMAL OUTDOOR COVERAGE AND RELIABILITY

CUSTOMER 3
HIGHER MAX THROUGHPUT WITH GUARANTEE

EXTENDED INDOOR COVERAGE AND RELIABILITY DUE TO 600 MHz PROPAGATION

SLICE 1 — 408
SLICE 2 — 410
SLICE 3 — 412

CARRIERS:
N66 - COMMON
N70 - COMMON

CARRIERS:
N66 – ALLOCATED 1
N70 – ALLOCATED 1

CARRIERS:
N66 - RESERVED1
N70 - COMMON 1
N71 - RESERVED1
+ ALLOCATED 1

N66
ALLO-CATED 1   RESERVED 1   COMMON

N70
ALLO-CATED 1   RESERVED 1   COMMON

N71
ALLO-CATED 1   RESERVED 1   COMMON

ALLOCATED - PRIORITIZATION FOR ASSIGNED SLICE
RESERVED - ONLY AVAILABLE FOR ASSIGNED SLICE
COMMON - GENERALLY AVAILABLE

*FIG. 4*

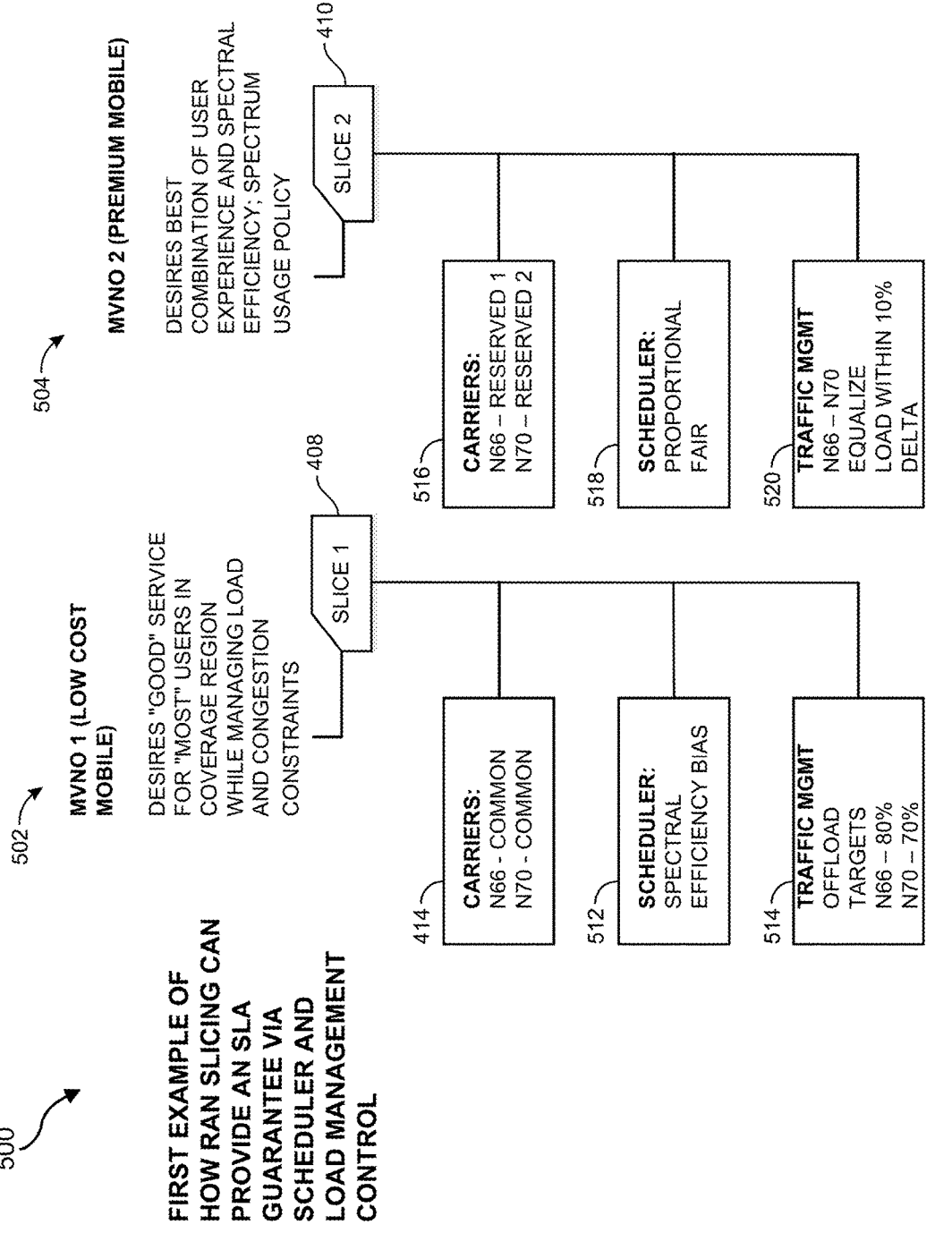

FIRST EXAMPLE OF HOW RAN SLICING CAN PROVIDE AN SLA GUARANTEE VIA SCHEDULER AND LOAD MANAGEMENT CONTROL

500

502

MVNO 1 (LOW COST MOBILE)

DESIRES "GOOD" SERVICE FOR "MOST" USERS IN COVERAGE REGION WHILE MANAGING LOAD AND CONGESTION CONSTRAINTS

504

MVNO 2 (PREMIUM MOBILE)

DESIRES BEST COMBINATION OF USER EXPERIENCE AND SPECTRAL EFFICIENCY; SPECTRUM USAGE POLICY

SLICE 1 — 408

SLICE 2 — 410

414 CARRIERS: N66 - COMMON N70 - COMMON

512 SCHEDULER: SPECTRAL EFFICIENCY BIAS

514 TRAFFIC MGMT OFFLOAD TARGETS N66 – 80% N70 – 70%

516 CARRIERS: N66 – RESERVED 1 N70 – RESERVED 2

518 SCHEDULER: PROPORTIONAL FAIR

520 TRAFFIC MGMT N66 – N70 EQUALIZE LOAD WITHIN 10% DELTA

FIG. 5

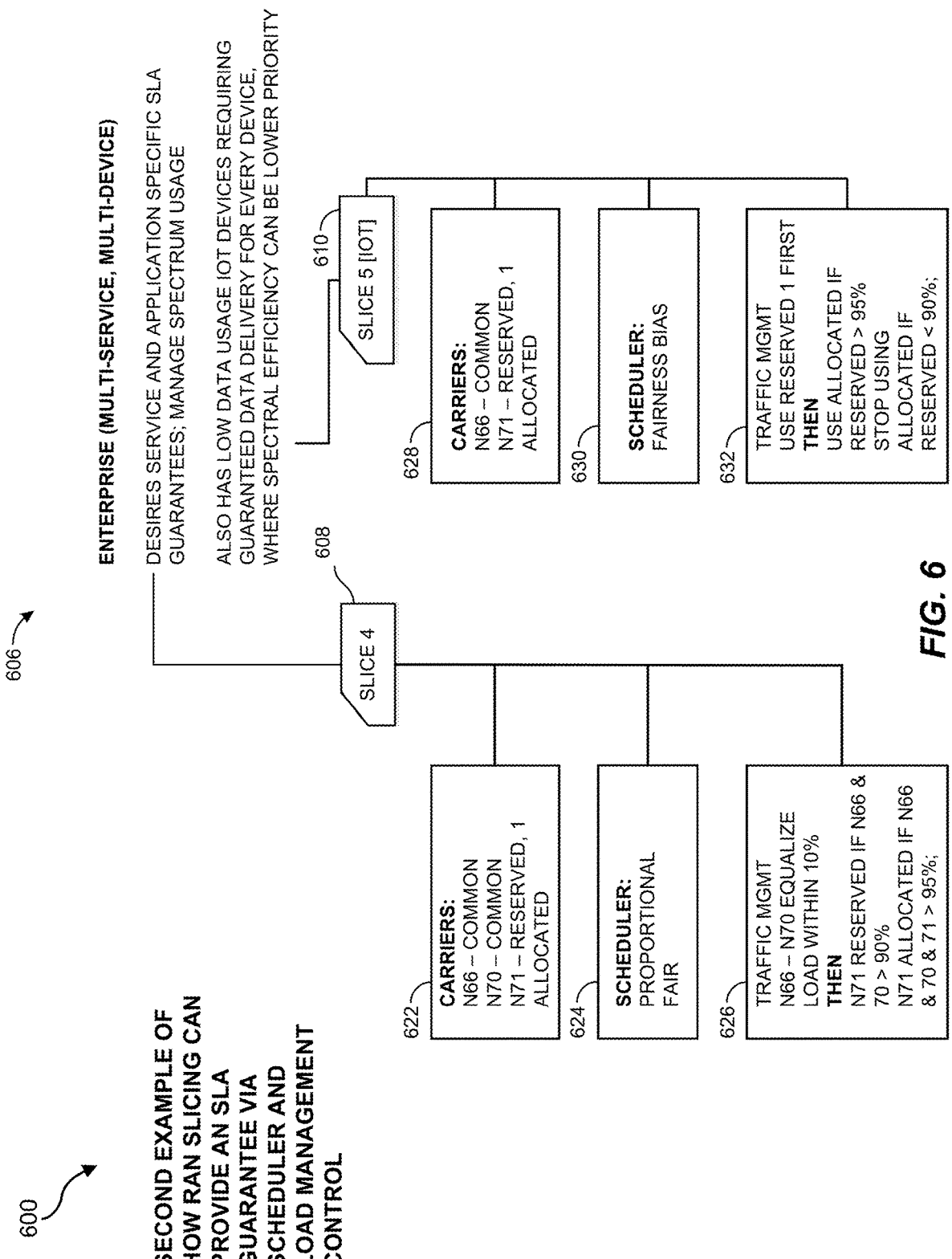

600 —

SECOND EXAMPLE OF HOW RAN SLICING CAN PROVIDE AN SLA GUARANTEE VIA SCHEDULER AND LOAD MANAGEMENT CONTROL

606 —

ENTERPRISE (MULTI-SERVICE, MULTI-DEVICE)

DESIRES SERVICE AND APPLICATION SPECIFIC SLA GUARANTEES; MANAGE SPECTRUM USAGE

ALSO HAS LOW DATA USAGE IOT DEVICES REQUIRING GUARANTEED DATA DELIVERY FOR EVERY DEVICE, WHERE SPECTRAL EFFICIENCY CAN BE LOWER PRIORITY

608 — SLICE 4

610 — SLICE 5 [IOT]

622 —
CARRIERS:
N66 – COMMON
N70 – COMMON
N71 – RESERVED, 1 ALLOCATED

624 —
SCHEDULER:
PROPORTIONAL FAIR

626 —
TRAFFIC MGMT
N66 – N70 EQUALIZE LOAD WITHIN 10%
THEN
N71 RESERVED IF N66 & 70 > 90%
N71 ALLOCATED IF N66 & 70 & 71 > 95%;

628 —
CARRIERS:
N66 – COMMON
N71 – RESERVED, 1 ALLOCATED

630 —
SCHEDULER:
FAIRNESS BIAS

632 —
TRAFFIC MGMT
USE RESERVED 1 FIRST
THEN
USE ALLOCATED IF RESERVED > 95%
STOP USING ALLOCATED IF RESERVED < 90%;

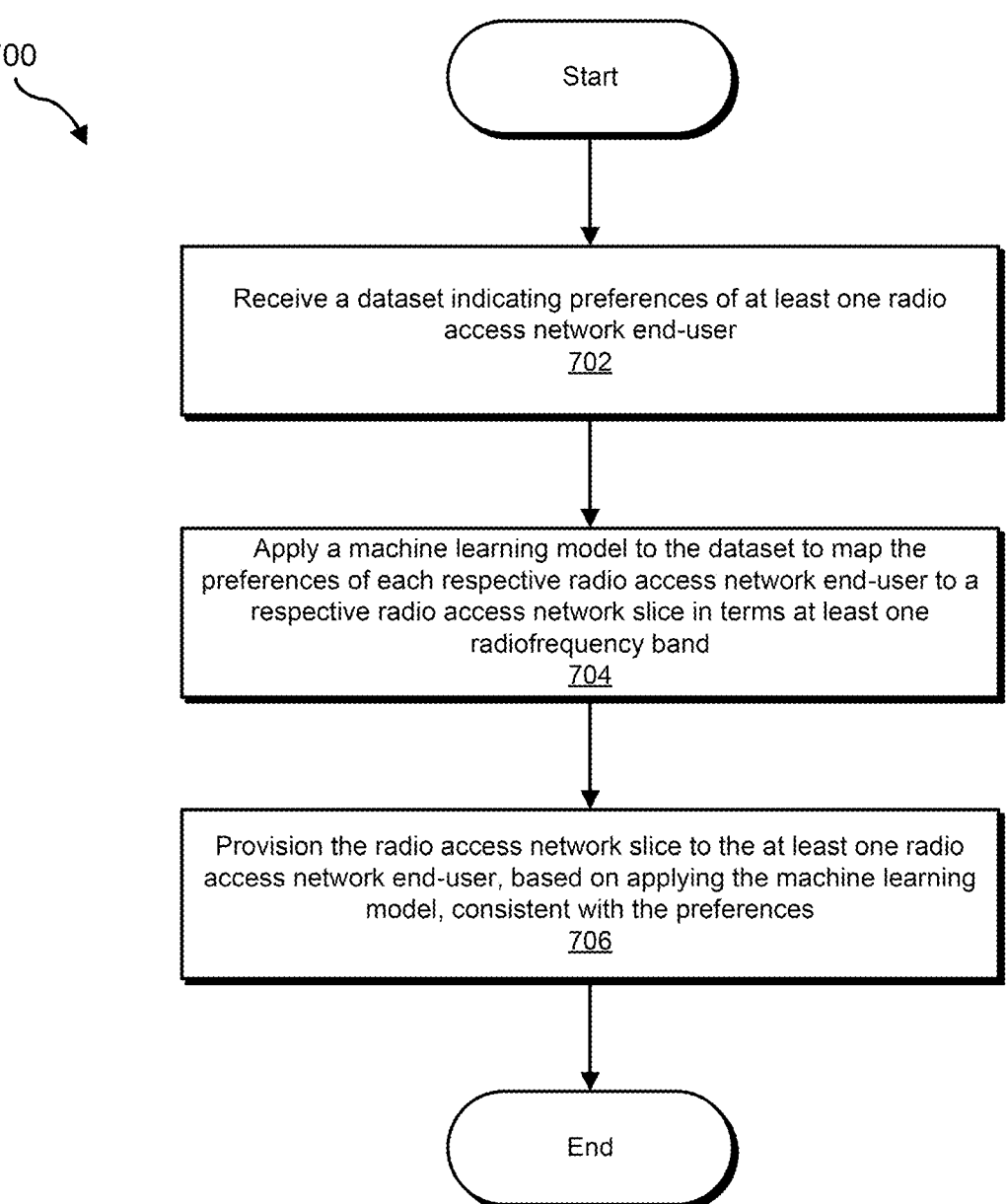

Start

Receive a dataset indicating preferences of at least one radio access network end-user
702

Apply a machine learning model to the dataset to map the preferences of each respective radio access network end-user to a respective radio access network slice in terms at least one radiofrequency band
704

Provision the radio access network slice to the at least one radio access network end-user, based on applying the machine learning model, consistent with the preferences
706

End

*FIG. 7*

RADIO ACCESS NETWORK SLICING

BRIEF SUMMARY

This application is generally directed to radio access network slicing and corresponding improvements in end-user-specific tailoring of radio access network slices, as discussed further below. In one illustrative example, a method may include (i) providing, to an end-user of a radio access network, a graphical user interface that enables the end-user to configure at least one of a plurality of control knobs for configuring a slice of the radio access network, (ii) receiving, after the providing the graphical user interface, user input from the end-user through the graphical user interface indicating how the end-user would adjust the at least one of the control knobs for configuring the slice of the radio access network, and (iii) configuring the slice of the radio access network according to the user input from the end-user through the graphical user interface.

In further examples, the at least one control knob comprises a frequency control knob.

In further examples, the frequency control knob enables the end-user to select a radio frequency band.

In further examples, the frequency control knob enables the end-user to combine multiple radio frequency bands.

In further examples, the at least one control knob comprises a resource control knob.

In further examples, the resource control knob enables the end-user to implement a schedule of radio access network resource consumption.

In further examples, the resource control knob enables the end-user to implement at least one load management policy.

In further examples, the at least one control knob comprises a performance control knob.

In further examples, the performance control knob enables the end-user to aggregate multiple distinct network carriers.

In further examples, the performance control knob enables the user to select which multiple distinct network carriers to aggregate.

A corresponding system may include a radio access network and a graphical user interface. The graphical user interface may be configured to (i) enable an end-user of a radio access network to configure at least one of a plurality of control knobs for configuring a slice of the radio access network, (ii) receive user input from the end-user through the graphical user interface indicating how the end-user would adjust the at least one of the control knobs for configuring the slice of the radio access network, and (iii) configure the slice of the radio access network according to the user input from the end-user through the graphical user interface.

A corresponding non-transitory computer-readable medium may include instructions that, when executed by at least one physical processor of a computing device, cause the computing device to perform a method including (i) providing, to a user of a radio access network, a graphical user interface that enables the user to configure at least one of a plurality of control knobs for configuring a slice of the radio access network, (ii) receiving, after the providing the graphical user interface, user input from the user through the graphical user interface indicating how the user adjusted the at least one of the control knobs for configuring the slice of the radio access network, and (iii) configuring the slice of the radio access network according to the user input from the user from the graphical user interface.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 shows a high-level diagram listing examples of graphical user interface knobs relating to systems and methods for performing radio access network slicing.

FIG. 3 shows another high-level diagram listing further examples of graphical user interface knobs relating to systems and methods for performing radio access network slicing.

FIG. 4 shows a diagram of three separate examples of radio access network slices generated or configured according to one or more of the methods described herein.

FIG. 5 shows a diagram of two separate examples of radio access network slices generated or configured according to one or more of the methods described herein.

FIG. 6 shows a diagram of two additional separate examples of radio access network slices generated or configured according to one or more of the methods described herein.

FIG. 7 shows a flow diagram for an example method for matching, through machine learning, end-user preferences and radio access network slices or configurations.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
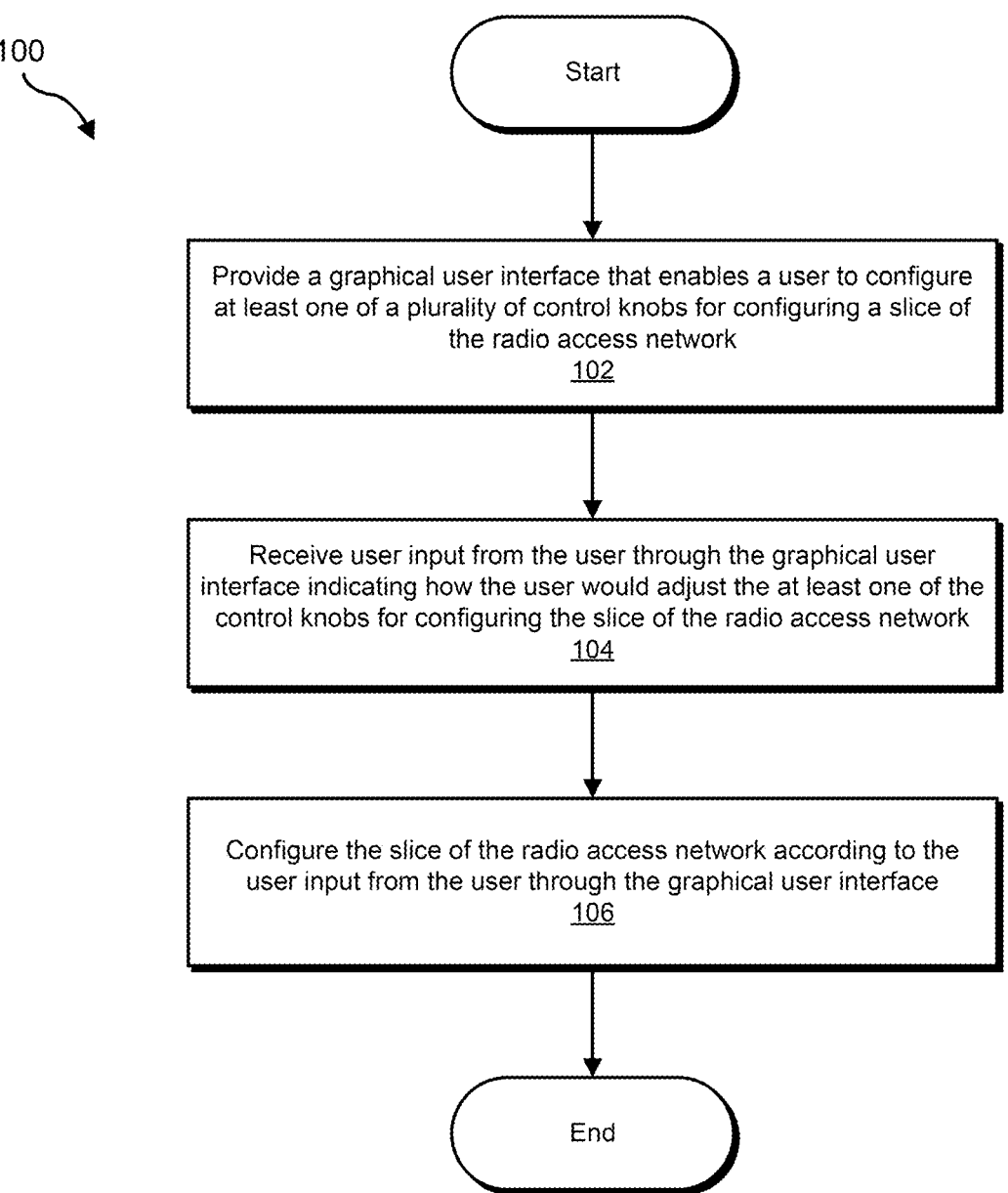
FIG. 1 shows a flow diagram for an example method for performing radio access network slicing.

FIG. 1 shows a flow diagram for an example method 100 for performing radio access network slicing. At step 102, one or more of the systems described herein may provide, to an end-user of a radio access network, a graphical user interface that enables the end-user to configure at least one of a plurality of control knobs for configuring a slice of the radio access network.

As used herein, the term "end-user" can refer to a user, such as a corporate enterprise, that actually utilizes the radio access network, as distinct from merely administering, provisioning, maintaining, and/or selling or otherwise providing access to the radio access network. In other words, the term generally refers to a user having a predominant relationship with the radio access network as an end-user, customer, or subscriber, as distinct from one or more administrators or engineers providing the radio access network itself. By analogy, an enterprise organization that subscribes to Internet access through an ISP such as Comcast would constitute an end-user of the Internet services. The term thereby helps to highlight one or more inventive improvements disclosed by this application, whereby end-users (e.g., customers or subscribers) are provided more personalized, tailored, bespoke, or customized network experiences based on corresponding customized slices or configurations of at least part of the radio access network.

Moreover, as used herein, the term "control knob" broadly refers, as a generic term, to any suitable graphical user interface element (e.g., dial, scroll bar, text input box, buttons for toggling, switches, etc.) enabling an end-user to adjust one or more aspects of a corresponding radio access network slice or configuration, as discussed further below.

Furthermore, as used herein, the term "slice" generally refers to a particular configuration or customization of at least part of a radio access network to provide a differentiated experience for one end-user matching or assigned to that slice, and consistent with the discussion of the illustrative examples of control knobs and customization functionality relating to FIGS. 2-6, as discussed in more detail below. In other words, despite the slicing procedure, the same essential underlying (e.g., physical) network components remain the same, and yet the way that these components are operated and made available to a particular customer might be different from one customer to the next customer. As one illustrative example, all of the resources might be divided into two portions and one customer theoretically could get half of the network, whereas another one could get half, and so on. Thus, according to radio access network slicing, there will be differentiation in the ways that the network is applied between subscribers or customers, and differentiation in how the networks resources are parceled out based on each customer's particular configuration and/or preferences.

The graphical user interface may be provided to the end-user in a variety of ways. Generally speaking, the graphical user interface may be provided by owners, administrators, or other individuals associated with the radio access network to enable corresponding end-users, customers, or subscribers to further customize a particular slice of the radio access network that is particularly tailored to their preferences, desires, needs, etc. In some illustrative examples, the graphical user interface may be provided through a World Wide Web interface that is associated with the radio access network. Additionally, or alternatively, in other examples the graphical user interface may be provided as part of a smart phone or other mobile device application. Those having skill in the art will readily ascertain that the graphical user interface can be provided to one or more end-users in a variety of different ways, as appropriate (e.g., as part of a downloaded executable, by transmission of a corresponding computer-readable medium, etc.).

The graphical user interface may generally enable end-users, subscribers, or customers, etc., to directly or indirectly specify, adjust, or otherwise configure their own radio access network slices, which might otherwise only be performed on the backend by the radio access network and/or its administrators according to related methodologies (e.g., user indicated preferences can indirectly specify control knob adjustments, as discussed further below in connection with FIGS. 4-6, for example). Thus, in various embodiments the technology of this application newly provides end-users with enhanced control and management capabilities relating to their own radio access network slices and corresponding preferences, as discussed in more detail below relating to FIGS. 2-6. The end result may include a more streamlined and convenient experience for the end-users, as well as network experiences based on corresponding slices that more accurately and efficiently satisfy the differentiated preferences of these end-users. Moreover, although the discussion of one or more embodiments relating to FIG. 1 focuses upon user input from end-users, the user input to the graphical user phase can also be provided by radio access network administrator or provider.

The graphical user interface may not necessarily provide the same overall comprehensive set of options to each end-user, customer, or subscriber. Rather, just as radio access network slices may themselves be customized, so too may the graphical user interface be customized to reflect the particular circumstances of each end-user. For example, a particular end-user might be limited in terms of options or control knobs that are available to the particular end-user due to one or more attributes of the end-user. As a further example, different end-users might be slotted to different tiers of privileges, and end-users within each different tier might be exposed to a different set of options specific to each particular tier. Moreover, in some examples, different customers may lack visibility into one or more configurable options due to one or more limitations (e.g., a particular feature is not provided in the particular location where the end-user is located).

Returning to FIG. 1, at step 104, one or more of the systems described herein may receive, after the providing of the graphical user interface, user input from the end-user through the graphical user interface indicating how the end-user would adjust the at least one of the control knobs for configuring the slice of the radio access network. FIGS. 2-3 show high-level diagrams of corresponding examples of control knobs that may be adjusted by one or more end-users consistent with step 104 of method 100.

FIGS. 2-3 together show sets of categories of control knobs that may be adjusted by one or more end-users in accordance with method 100. Both FIG. 2 and FIG. 3 show a row 202 for frequency control knobs, a row 204 for resource control knobs, and a row 206 for performance control knobs. FIG. 2 further shows that an example category 208 of frequency control knobs may relate to "selection" of a radio frequency band, an example category 218 of resource control knobs may relate to resource scheduling, and an example category 232 of performance control knobs may relate to carrier aggregation, as discussed further below. Similarly, FIG. 3 also further shows another category 302 of frequency knobs relating to the combination of radiofrequency bands, a category 310 of resource control knobs relating to resource load management, and a category 318 of performance control knobs relating to performance scheduling.

Regarding the categories corresponding to the frequency control knobs (e.g., selection and combination), these control knobs can enable one or more end-users to select which radiofrequency band is used in order to provide network service. With respect to the frequency selection control knob, a specific radio frequency band could be specified (see element 212 in FIG. 2) as part of a radio access network slice, as configured by the end-user. Moreover, a specified amount of bandwidth that is desired or requested to be provided through that radiofrequency band could also be part of the same radio access network slice (see element 214 in FIG. 2). Furthermore, these frequency control knobs may enable the end-user to specify whether the identified radiofrequency band for this particular radio access network slice is going to be shared or, instead, dedicated.

Regarding the category 302 for the frequency combination control knob (see FIG. 3), this control knob can enable an end-user to combine bands (see element 306 in FIG. 3), and this combination process can result in a predictable level of performance. As one illustrative example, 600 megahertz and 2.2 gigahertz bands, if combined, give a different user experience to the end-user compared to the combination of 2.2 gigahertz and 2.1 gigahertz. Using the methodology of FIG. 1, the end-user can also choose when to perform the combination procedure. As one illustrative example, the end-user can specify that, upon achieving 90% usage of a first band, then a second band will be added, and yet the second band is not to be added until the 90% threshold is achieved. In this manner, multiple different policies can be made available, implemented, and/or combined, and the usage of these policies can be monetized with respect to end-users, such as customers or subscribers of radio access networks (e.g., corresponding to 5G and similar communications networks).

Returning to FIGS. 2-3, row 204 further specifies examples of resource control knobs including both the category 218 for resource scheduling and the category 310 for load management. With respect to resource scheduling, header 222 identifies four separate types of schedulers, corresponding to elements 224-230. Generally speaking, even if a particular end-user has been assigned to a certain band, a graphical user interface corresponding to FIGS. 2-3 can implement differentiation between two separate corporate enterprises as customers. By way of illustrative example, a first enterprise might seek to obtain scheduling of resources based on a consideration of its best users. In such examples, users who have the best radio frequency conditions may be allocated a proportional amount greater to their overall spectrum, thereby helping to improve spectral efficiency (see elements 224-226). On the other hand, for a second enterprise, this enterprise can be assigned resource scheduling focused on fairness (e.g., proportional fairness) rather than spectral efficiency. Basically, a proportional fair type of resource scheduling may indicate that negative aspects of resource constraints (e.g., congestion, etc.) can be allocated essentially equally between different end-users to thereby create an effectively equal end-user experience. As another illustrative example of a resource scheduling configuration, element 230 refers to a variable packet delay budget, which can intelligently delay one or more different network packets according to a predefined policy or budget.

With respect to category 310 of resource control knobs for load management (see FIG. 3), these particular resource control knobs can differentiate between two different radio access network slices, even when the previously discussed control knobs (e.g., frequency selection and combination, on the one hand, and resource scheduling on the other hand) remain effectively the same between these two slices. With respect to these resource control knobs for load management, the end-user can specify a change of utilization of when different carriers are used (see element 314 in FIG. 3), whether end-users are permitted to equally load up carriers or unequally load them up, and/or when to move traffic from one carrier to another (see element 316 in FIG. 3).

Returning to FIGS. 2-3, the last row 206 corresponding to performance control knobs includes both a category 232 relating to carrier aggregation and a category 206 relating to performance scheduling. Thus, even in a scenario where various control knobs are essentially the same between two different radio access network slices, adjustments of corresponding performance control knobs can nevertheless enable the end-user to tweak, or otherwise configure, the network performance experienced by one enterprise. With respect to category 232 corresponding to carrier aggregation, the end-user can specify to allow carrier aggregation, which can refer to a scenario where a particular end-user is able to use both of two bands simultaneously. Accordingly, in these scenarios, the end-user should be able to receive everything over the network that the end-user is seeking on one band, while also simultaneously having the same level of access on the second band. Alternatively, a different end-user might specify to disallow carrier aggregation. Moreover, these particular performance control bands may also enable the end-user to specify, not just whether aggregation is permitted, as discussed above, but also to further specify which particular carriers will be included within a particular aggregation (see element 238 in FIG. 2).

Regarding category 318 of performance control knobs shown in FIG. 3, this figure further highlights three examples of such performance control knobs, corresponding to elements 322-328. Regarding element 322, a quality-of-service (QoS) tradeoff generally relates to scenarios guaranteeing a particular bit rate to a specific end-user. Moreover, these guaranteed bit rates can be different between different end-user customers, thereby facilitating the performance of radio access network slicing. As one illustrative example, a first customer may be assigned a guaranteed bit rate of 20, 30, or 50 kbps while, nevertheless, a second customer might be assigned a guaranteed bit rate of 100 kbps. Moreover, in various scenarios, these two different customers may be using the same or similar applications, and yet in other scenarios two different end-users may be using substantially different applications, resulting in substantially different radio access network slice configurations as appropriate.

As another illustrative example, a first enterprise might be using Cisco WebEx whereas a second enterprise might be using Cisco WebEx, Zoom, and Google applications. Accordingly, in such scenarios, if a better guaranteed bit rate is assigned to this second enterprise in terms of voice or video calling, then the second enterprise will have the option to run multiple applications simultaneously. In contrast, the first enterprise might be effectively limited to only executing one of these applications (e.g., Cisco WebEx). Moreover, in such scenarios, if the first enterprise begins to run a second application, or to add additional applications, or to furthermore add one or more users on the same type of application, then the network may respond such that the bit rate is effectively going down, and also the quality of service is proportionally diminishing. Similarly, FIG. 3 also further illustrates how a performance control knob for performance scheduling can effectively configure or adjust a packet error rate and/or a corresponding delay (see elements 326 and 328 in FIG. 3).

FIG. 4 shows an example diagram 400 that further illustrates how three separate slices of a radio access network might be configured using one or more frequency control knobs (e.g., frequency selection and combination control knobs), as first discussed above in connection with FIGS. 2-3. In particular, this figure further illustrates how a customer 402, a customer 404, and a customer 406 may indicate respective preferences (in FIG. 4 these preferences are stated just beneath the reference numerals for the customers), which can be intelligently translated into a respective radio access network slice 408 (for customer 402), respective radio access network slice 410 (for customer 404), and/or a respective radio access network slice 412 (for customer 406). In particular, this figure highlights how customer 402 may have specified preferences for maximum throughput that is load and congestion limited, while maintaining normal outdoor coverage and reliability. In contrast, customer 404 may have specified preferences indicating that a maximum throughput is guaranteed during a load phase, while also further specifying normal outdoor coverage and reliability. Lastly, customer 406 may have specified a higher maximum throughput in addition to a guarantee, while also further specifying extended indoor and reliability. Moreover, this figure also further illustrates how three separate radiofrequency bands 420 (band N66), 422 (band N70), and 424 (band N71) may be intelligently partitioned out and assigned to different ones of the three radio access network slices identified above consistent with the preferences that each customer has indicated (e.g., where band N66 refers to 2+ gigahertz and band N70 is similar, whereas band N1 refers to 600 megahertz).

Regarding the first customer 402, this customer may have effectively indicated that the customer desires maximum throughput, except that in cases of load or congestion the customer indicates a willingness to tolerate or accept less than maximum throughput. In summary, this particular customer has indicated a willingness to tolerate less than maximum throughput due to load or congestion, and yet the customer does not desire to be limited artificially (e.g., outside of load or congestion circumstances). The customer may also indicate a desire for normal outdoor coverage (where normal can be defined in terms of percentage reliability or consistent with statistical averages, etc.). In view of the stated preferences from the corresponding end-user, slice 408 may combine two common portions of two separate radiofrequency bands, as indicated by box 414, which aggregates a common section 430 of the N66 band and a common section 430 of the N70 band.

By way of background, each of the radiofrequency bands 420, 422, and 424 further include an allocated section 426, a reserved section 428, and a common section 426. Each respective allocated section can refer to a scenario where access to the particular section of spectrum is prioritized for the assigned slice. Accordingly, in one example, if a particular slice has been assigned to an allocated portion of spectrum, then any end-user that has that slice identifier will have access to that portion of spectrum. In contrast, a reserved portion of spectrum may refer to scenarios where only end-users having the slice identifier for the specific slice are able to use that particular portion of the spectrum, and nobody else will have access (e.g., not even if the portion is otherwise going unused). The last type of spectrum is common, which refers to scenarios where, regardless of whether a particular end-user has a slice identifier or not, the common portions can always be used. Thus, in view of the preferences of customer 402 outlined above, this particular customer has been assigned to two common portions of two different bands of radiofrequency spectrum, as further shown in box 414.

Returning to the example of FIG. 4, because N66 and N70 have the same propagation characteristics, slice 408 only gets assigned N66 and N70, as shown in box 414. Accordingly, for end-users assigned to slice 408, these end-users will only have access to common portions of the radiofrequency spectrum. In other words, these end-users will not have access to reserved or allocated portions of the spectrum.

In contrast, customer 404 is requesting a guaranteed maximum throughput, as further discussed above, and as specified near the top of FIG. 4. Accordingly, this particular customer is indicating a desire to achieve maximum throughput even if there is a load on the network. As further shown in this figure, customer 404 desires a degree of priority, but does not have particularly sensitive concerns regarding outdoor coverage and reliability. Accordingly, this customer is receiving priority for allocated section 426 of band N66 and allocated section 426 of band N70.

Lastly, customer 406 has been assigned reserved section 428 of band N71 and reserved section 428 of band N71, consistent with the customers indicated desire of a higher maximum throughput with an associated guarantee. This customer has also been assigned a common section 430 of band N70, as well as allocated section 426 of band N71. Accordingly, even if this customer uses up all of its reserved spectrum, the customer may nevertheless thereafter compete with remaining end-users as equals, etc. Accordingly, the example of customer 406 helps to further illustrate how reserved spectrum may be assigned to a specific slice such that, if end-users for that specific slice do not use the reserved spectrum, then this portion of spectrum simply goes unused (i.e., the highest level of priority).

FIGS. 5-6 show additional illustrative diagrams 500 and 600 of how indications of end-user preferences may be mapped to corresponding radio access network slices. As with FIG. 4, FIGS. 5-6 map the indicated preferences of customers 502, 504, and 606 to respective radio access network slices 408, 410, 608, and 610. Moreover, as with FIG. 4, the mappings of FIGS. 5-6 further specify radiofrequency bands and/or categorizations of assigned portions or sections of these bands, as indicated by boxes 414, 516, 608, and 610. These aspects of the mappings may be generated using one or more of the frequency control knobs discussed above in connection with FIGS. 2-3 (e.g., frequency selection and combination control knobs).

In addition to the above, however, the examples of FIGS. 5-6 also further illustrate, in boxes 512, 518, 624, and/or 630, how the indicated preferences of end-users may be mapped to one or more scheduler types (e.g., corresponding to category 218 of FIG. 2). Similarly, the examples of these figures also further illustrate, in boxes 514, 520, 626, and 632, how the indicated preferences of end-users may be mapped to one or more traffic management policies (e.g., corresponding to category 310 of FIG. 3).

In particular, FIG. 6 further illustrates the potential for multiple slices to be mapped to a single end-user, or vice versa. Customer 606 may correspond to an enterprise that provides multiple services and multiple devices to individuals within the corresponding organization. This particular enterprise desires service and application-specific service level agreement guarantees, while also managing spectrum usage. Additionally, this enterprise also has low data usage on Internet-of-Things devices that require or request guaranteed data delivery for every device, and in these scenarios spectral efficiency can be lower priority.

In some examples, method 100 may be implemented in part, or facilitated by, application of one or more machine learning models. FIG. 7 shows a flow diagram for an illustrative example method 700 for radio access network slicing that leverages a machine learning model. At step 702, one or more of the systems described herein may receive a data set indicating preferences of at least one radio access network end-user. Subsequently, at step 704, one or more of the systems described herein may apply a machine learning model to the dataset to map the preferences of each respective radio access network end-user to a respective radio access network slice in terms of at least one radiofrequency band. In the context of the example of FIG. 4, the machine learning model effectively except, as inputs, indications of end-user preferences (e.g., the examples of preferences shown in FIG. 4, such as "max throughput is loaded congestion limited," "normal outdoor coverage and reliability," and/or "higher maximum throughput with guarantee," etc.") and thereby map these preferences to radio access network slices, which further correspond to sets of one or more categories portions of radio frequency spectrum such as sections 426, 428, and 430 shown in FIG. 4. In other words, the machine learning algorithm generates the lines connecting boxes 414, 416, and 418 to sections 426, 428, and 430, as outputs.

In some examples, the machine learning model may correspond to a supervised or unsupervised machine learning model. For example, administrators of the radio access network may assign, on a random, semi-random, arbitrary, or other basis, various radio access network slices to initial end-users as part of a training dataset. Subsequently, administrators or others may monitor or evaluate usage by these initial end-users to determine a level of fit between the indicated preferences of the initial end-users and the radio access network slices that were initially assigned. The administrator or others may then adjust, tweak, or otherwise alter one or more rules, heuristics, or machine learning configurations, to further increase or optimize the fit between indicated end-user preferences and corresponding assigned radio access network slices. For example, previously generated mappings between preferences and slices may be labeled as successful or unsuccessful, and then subsequently used according to a supervised machine learning methodology.

As described above, the technology of this application may improve on related methodologies in a variety of different ways. Consistent with the discussion of control knobs above, the technology of this application may enable network administrators and/or end-users to directly or indirectly indicate preferences, or other corresponding adjustments, to one or more aspects or attributes of a radio access network slice. The slices may be defined in software, for example, such as by using a data structure that includes, within the data structure, one or more elements, where each element corresponds to one of the control knobs outlined above and a corresponding value for that respective field (see, e.g., the discussion of FIGS. 2-6, outlining different values or options for each control knob that, together, can define a slice in software). Such a data structure may include elements for any suitable permutation of one or more of the various control knobs discussed above.

Generally speaking, the technology of this application can improve upon related methodologies by applying, or leveraging, new variations of slicing procedures in an inventive manner to radio access networks. In contrast, related methodologies may only apply slicing in the context of a cellular core network, which can refer to having multiple slices on an Access and Mobility Management Function (AMF) component, Session Management Function (SMF) component, User Plane Function (UPF) component, or can refer to dedicated UPFs, dedicated AMFs as distinct from combined AMFs, etc. Accordingly, as distinct from the context of core functionality listed above, the various slicing procedures outlined above can be applied, by the technology of this application, in a new and inventive way to radio access networks.

Figure 8:
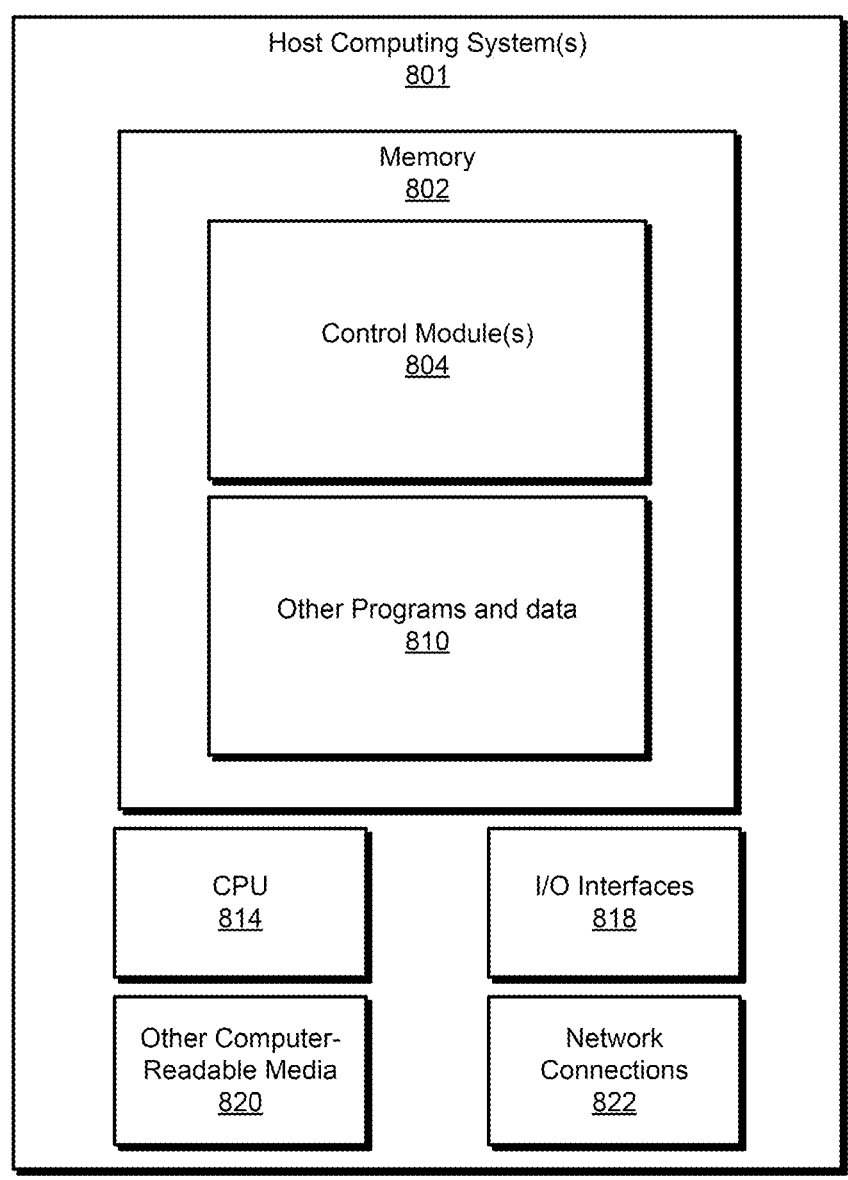
FIG. 8 shows a diagram of an example computing system that may facilitate the performance of one or more of the methods described here.

FIG. 8 shows a system diagram that describes an example implementation of a computing system(s) for implementing embodiments described herein. The functionality described herein for radio access network slicing can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computer system(s) 801. For example, such computer system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein for radio access network slicing. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   receiving a dataset indicating preferences of at least one radio access network end-user;
   applying a machine learning model to the dataset to map the preferences of each respective radio access network end-user to a respective radio access network slice in terms of at least one radiofrequency band; and
   provisioning the radio access network slice to the at least one radio access network end-user, based on applying the machine learning model, consistent with the preferences;
   wherein the preferences for a first end-user indicate at least one of:
   a preference for maximum throughput except in a network load or congested condition;
   a preference for maximum throughput guaranteed even during the network load or congested condition; or
   a preference for an elevated maximum throughput that is guaranteed even during the network load or congested condition.

2. The method of claim 1, further comprising mapping the preferences of the first end-user to multiple distinct radiofrequency bands.

3. The method of claim 1, wherein the at least one radiofrequency band is categorized as either common, allocated, or reserved.

4. The method of claim 1, wherein the preferences for the first end-user indicate at least one of:
   statistically normal outdoor coverage and reliability; or
   extended indoor coverage and reliability.

5. The method of claim 1, wherein:
   each respective radio access network slice is defined in terms of a set of pairs; and
   each pair specifies both a radiofrequency band and a portion of the radiofrequency band
   categorized as either common, allocated, or reserved.

6. The method of claim 1, further comprising:
   receiving an indication that the first end-user has exhausted a reserved portion of radiofrequency spectrum; and
   provisioning, in response to receiving the indication, at least a portion of common or allocated radiofrequency spectrum to the first end-user.

7. The method of claim 1, wherein the machine learning model was trained on a training dataset that mapped previous indications of end-user preferences to respective radio access network slices.

8. The method of claim 7, wherein the machine learning model was supervised due to labels of successful or unsuccessful mappings within the training dataset.

9. The method of claim 7, wherein the machine learning model was unsupervised.

10. A system comprising:
    a physical computing processor; and
    a non-transitory computer-readable medium encoding instructions that, when executed by the physical computing processor, cause a computing device to perform a method comprising:
    receiving a dataset indicating preferences of at least one radio access network end-user;
    applying a machine learning model to the dataset to map the preferences of each respective radio access network end-user to a respective radio access network slice in terms of at least one radiofrequency band; and
    provisioning the radio access network slice to the at least one radio access network end-user, based on applying the machine learning model, consistent with the preferences;
    wherein the preferences for a first end-user indicate at least one of:
    a preference for maximum throughput except in a network load or congested condition;
    a preference for maximum throughput guaranteed even during the network load or congested condition; or
    a preference for an elevated maximum throughput that is guaranteed even during the network load or congested condition.

11. The system of claim 10, wherein the system is further configured to map the preferences of the first end-user to multiple distinct radiofrequency bands.

12. The system of claim 10, wherein the at least one radiofrequency band is categorized as either common, allocated, or reserved.

13. The system of claim 10, wherein the preferences for the first end-user indicate at least one of:
    statistically normal outdoor coverage and reliability; or
    extended indoor coverage and reliability.

14. The system of claim 10, wherein:
    each respective radio access network slice is defined in terms of a set of pairs; and
    each pair specifies both a radiofrequency band and a portion of the radiofrequency band
    categorized as either common, allocated, or reserved.

15. The system of claim 10, wherein the system is further configured to perform:

receiving an indication that the first end-user has exhausted a reserved portion of radiofrequency spectrum; and provisioning, in response to receiving the indication, at least a portion of common or allocated radiofrequency spectrum to the first end-user.

16. The system of claim 10, wherein the machine learning model was trained on a training dataset that mapped previous indications of end-user preferences to respective radio access network slices.

17. The system of claim 16, wherein the machine learning model was supervised due to labels of successful or unsuccessful mappings within the training dataset.

18. A non-transitory computer-readable medium encoding instructions that, when executed by at least one physical processor of a computing device, cause the computing device to perform a method comprising:

receiving a dataset indicating preferences of at least one radio access network end-user;

applying a machine learning model to the dataset to map the preferences of each respective radio access network end-user to a respective radio access network slice in terms of at least one radiofrequency band; and provisioning the radio access network slice to the at least one radio access network end-user, based on applying the machine learning model, consistent with the preferences;

wherein the preferences for a first end-user indicate at least one of:

a preference for maximum throughput except in a network load or congested condition;

a preference for maximum throughput guaranteed even during the network load or congested condition; or a preference for an elevated maximum throughput that is guaranteed even during the network load or congested condition.

* * * * *